(12) United States Patent
Hanner

(10) Patent No.: US 7,567,568 B2
(45) Date of Patent: Jul. 28, 2009

(54) METHOD AND APPARATUS FOR USER IDENTIFICATION IN COMPUTER TRAFFIC

(75) Inventor: Brian Hanner, Campbell, CA (US)

(73) Assignee: The Boeing Company, Chicago, IL (US)

(*) Notice: Subject to any disclaimer, the term of this patent is extended or adjusted under 35 U.S.C. 154(b) by 707 days.

(21) Appl. No.: 11/136,801

(22) Filed: May 24, 2005

(65) Prior Publication Data

US 2006/0268875 A1    Nov. 30, 2006

(51) Int. Cl.
*H04L 12/28* (2006.01)
(52) U.S. Cl. .................... 370/392; 370/477; 370/472
(58) Field of Classification Search .......... 370/389, 370/470–472, 474–477, 521, 392, 497; 709/247
See application file for complete search history.

(56) References Cited

U.S. PATENT DOCUMENTS

| | | | |
|---|---|---|---|
| 7,054,855 B2* | 5/2006 | Basso et al. ............... | 707/3 |
| 7,305,615 B2* | 12/2007 | Ross ........................ | 715/234 |
| 2003/0088788 A1* | 5/2003 | Yang ....................... | 713/201 |
| 2004/0125799 A1* | 7/2004 | Buer ....................... | 370/389 |
| 2004/0190506 A1* | 9/2004 | Davis et al. ............... | 370/389 |
| 2006/0031357 A1* | 2/2006 | Misra et al. ............... | 709/206 |
| 2006/0053095 A1* | 3/2006 | Koch et al. ................ | 707/3 |

FOREIGN PATENT DOCUMENTS

| | | |
|---|---|---|
| EP | 0238256 A2 | 9/1987 |
| WO | WO 01/33822 A1 | 5/2001 |
| WO | WO 01/91374 A1 | 11/2001 |
| WO | WO 03/014940 A1 | 2/2003 |
| WO | WO 03/047205 A1 | 6/2003 |
| WO | PCT/US2006/017496 | 10/2006 |

* cited by examiner

*Primary Examiner*—Ian N Moore
*Assistant Examiner*—Peter Cheng
(74) *Attorney, Agent, or Firm*—Yee & Associates, P.C.; Baldwin D. Quan

(57) ABSTRACT

Techniques are provided for determining whether network traffic includes a user identifier of interest. Each byte of network traffic is classified as being either a valid character, an invalid character, or a delimiter character. An information stream can be generated based on the classification. Storage of valid characters in the information stream can be initiated when a first delimiter character is detected. Storage of valid characters in the information stream can be stopped when a second delimiter character is detected. The stored valid characters between the first delimiter character and the second delimiter character can be examined to determine whether the stored valid characters correspond to a user identifier.

24 Claims, 4 Drawing Sheets

METHOD AND APPARATUS FOR USER IDENTIFICATION IN COMPUTER TRAFFIC

TECHNICAL FIELD

The present invention generally relates to search engines and, more particularly, to methods and apparatus for filtering packet data to identify user identifiers (IDs) from network traffic.

BACKGROUND

To monitor computer traffic of a specific individual, law enforcement agencies have traditionally obtained court orders authorizing them to collect or "tap" an individual's computer traffic. In this situation, the law enforcement agency would obtain authorization to monitor computer traffic at a particular user's Internet Service Provider (ISP) where traffic speeds are relatively slow (e.g. 150 megabits per second). The user's computer traffic is typically collected based on the user's Internet Protocol (IP) address.

However, in today's mobile society people can connect to the Internet in places such as cafes, airports, and libraries without using their ISP. In such situations a user's IP address cannot be used to identify the user's computer traffic. Instead, collection monitors must be placed on high speed Internet backbones where traffic of unknown origin is likely to be seen. To address these situations other techniques are needed to identify computer traffic associated with specific users regardless of where the user connects to the Internet.

One such approach is to identify user names which are buried within the various application protocols. This approach can be effective because user names tend to remain constant regardless of where an individual connects to the Internet. For example, email traffic such as Simple Mail Transport Protocol (SMTP) contains the email addresses of the sender and the recipients. To collect traffic associated with a particular user, these email addresses can be extracted and compared to a directory of email addresses associated with particular users who are "of interest." If there is a match between the user's identity and an identifier in the directory, that user's traffic can be collected for further review. In addition, traffic associated with application protocols such as the File Transfer Protocol (FTP) include user login names, webmail contains both login names and email addresses, and Internet Messaging (IM) contains user "handles."

However, these user identification and extraction techniques suffer from certain drawbacks. For example, the identification and extraction of user identifiers is processing intensive since computer traffic on the Internet can utilize a wide range of application protocols. For example, computer traffic may utilize application protocols such as email, webmail, and chat, among others. Unfortunately, each application protocol requires unique processing techniques to identify and extract user identifiers. In the context of the Internet, collection monitors should be capable of inspecting traffic from millions of users. However, due to the high data rates of Internet traffic, the processing element in the collection monitor can quickly become overwhelmed. As such, it has been unfeasible to create a processing element capable of running at data rates of 2.5 gigabits per second and above.

In the context of traffic monitoring, user identification and extraction techniques have typically been implemented via application layer processing in collection monitoring software. The performance of collection monitoring software is not sufficient at Internet speeds where traffic from hundreds of thousands, if not millions of computers is present. As a result, software-based collection monitors are now mainly used on Enterprise networks that run at speeds much slower than the Internet.

Collection monitors which implement hardware-based protocol decoders, such as application specific integrated circuits (ASIC) and field programmable gate arrays (FPGA), can theoretically perform protocol decoding much faster than software-based collection monitors. However, in the context of monitoring computer traffic on the Internet, such hardware-based protocol decoders can be difficult and expensive to implement due to the number of different application protocols. Because each application protocol typically requires a unique processing engine, a hardware-based protocol decoder would need to be capable of handling all desired application protocols.

Tag scanning techniques have been implemented in hybrid hardware-software collection monitoring solutions. Special high-speed hardware filters can detect combinations of characters that indicate the presence of user identifiers. For example, the character string "From:" might indicate the presence of a source email address. Software can then be used to execute extraction rules for isolating an email address which can then be compared to a user directory. Tag scanning techniques do not require processing of the protocol stack which improves performance. However, tags tend to appear often on high-speed networks and the extraction rules tend to be unique for each protocol. As such, the software component of these hybrid hardware-software solutions tends to limit performance of conventional tag scanning techniques because of the high rate of tag matches and the complexity of the extraction rules.

String searching techniques for identifying users look directly for user identifiers to extract the user identifiers without concern for the protocol or tags. For example, a string match of "bad.boy@nowhere.com" will identify email either to or from the owner of the email address, regardless of the protocol that it appears in (e.g. SMTP, POP3, IMAP, etc.). However, string searching techniques require a high-speed string search engine capable of checking for user IDs at every byte position within the packet data. Each check requires accessing a table of user IDs which must be done with the arrival of each byte of data. Networks operating at 2.4 Gigabits/sec require table lookups at the rate of 300 million per second which can only be achieved with redundant parallel processing engines. As such, string searching techniques for identifying users also tend to be performance limited.

There is a need for techniques which can identify specific user IDs which are buried within the various application protocols regardless of the application protocol being used without checking for the user IDs at every byte position within the packet data. Other desirable features and characteristics of the present invention will become apparent from the subsequent detailed description and the appended claims, taken in conjunction with the accompanying drawings and the foregoing technical field and background.

SUMMARY

Embodiments of the present invention can provide methods and apparatus configured to determine if network traffic comprising information units includes a user identifier of interest.

According to one embodiment, techniques are provided for determining whether network traffic includes a user identifier of interest. Each byte of network traffic is classified as being either a valid character, an invalid character, or a delimiter character. An information stream can be generated based on the classification. Storage of valid characters in the information stream can be initiated when a first delimiter character is detected. Storage of valid characters in the information stream can be stopped when a second delimiter character is detected. The stored valid characters between the first delimiter character and the second delimiter character can be examined to determine whether the stored valid characters correspond to a user identifier.

In another embodiment, an apparatus can be provided which comprises a translator, a shift register, a state machine, a memory and a comparator. The translator classifies each information unit as a first information type, a second information type, or a marker, and then generates an information stream based on the classification. The shift register can receive compressed data values corresponding to each first information type from the translator and generate register contents. The state machine receives the information stream and detects markers in the information stream. The state machine can clear the register contents when a first marker or a second information type is detected and can begin storing first information types in the information stream until a second marker is detected. In one implementation, the state machine begins storing compressed data values corresponding to each first information type in the information stream until the second marker is detected. The memory comprises a user identifier list which includes user identifiers for users of interest. The memory can receive the register contents and use the register contents as an address to the memory. The memory is configured to generate memory contents in response to the address. The comparator is coupled to the shift register and the memory. The comparator can compare the memory contents with the register contents and can determine if the register contents match one of the user identifiers stored in the memory.

BRIEF DESCRIPTION OF THE DRAWINGS

The present invention will be described in conjunction with the following drawing figures, wherein like numerals denote like elements.

DETAILED DESCRIPTION

Figure 1:
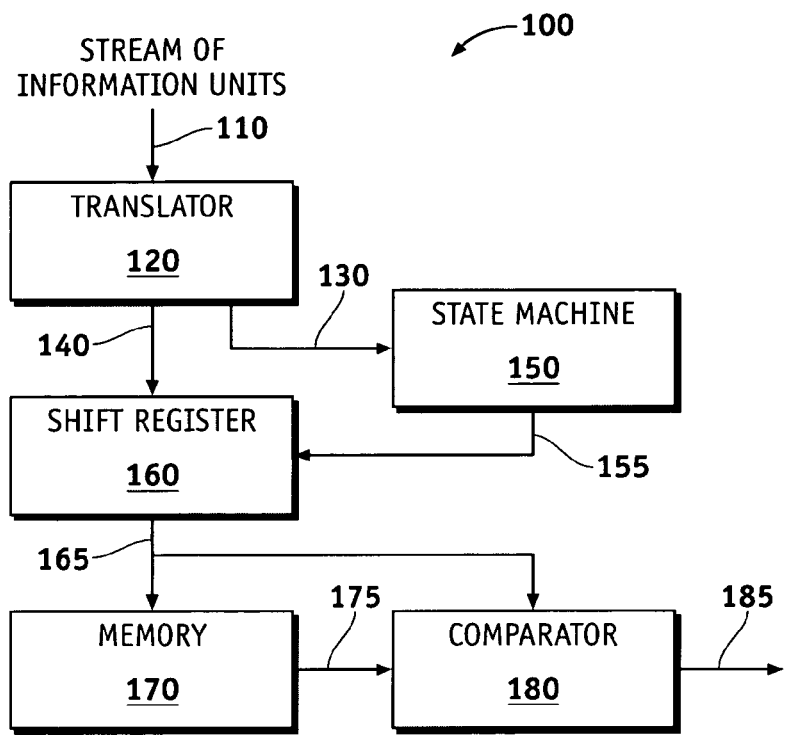
FIG. 1 is a block diagram of a network monitor according to one exemplary embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Definitions

As used herein, a "string" is a contiguous sequence of symbols or values, such as a character string (a sequence of characters) or a binary digit string (a sequence of binary values). Hashing is the transformation of a string of characters into a usually shorter fixed-length value or key that represents the original string. Hashing is typically used to index and retrieve items in a database because it is faster to find the item using the shorter hashed key than to find it using the original value. A search for any items typically involves computing a hash value using the same hash function used to store the item and then comparing for a match using that value.

As used herein, a "delimiter" refers to a character that identifies or marks the beginning or the end of a string or sequence of characters. The delimiter character is not part of the string.

As used herein, a "comparator" refers to a device which accepts two inputs and produces an output.

As used herein, a "register" refers to storage device which holds data. A register can be implemented as a group of flip-flops operating as a coherent unit to hold data.

As used herein, a "shift register" refers to a sequential logic circuit which stores digital data and sifts the digital data through it. A shift register can be implemented as a group of flip-flops connected in a chain so that a data output from one flip-flop is shifted and becomes a data input of the next flip-flop. A shift register can be implemented as a serial in-serial out shift register or a serial in-parallel out shift register.

As used herein, a "lookup table" refers to a table which includes a set of values for input or output relationships. A lookup table may be used to transform data in some applications. A lookup table can be implemented as a data structure, usually an array or associative array, used to replace a runtime computation with a simpler lookup operation.

As used herein, a "hash table" refers to a data structure for storing information that allows specific information to be quickly located. A hash table typically comprises an array and a hash function. The array which is the actual table where the data to be searched is stored, and the hash function provides mapping from an input space to an integer space that defines indices of the array. In other words, the hash function provides a way for assigning numbers to the input data such that the data can then be stored at the array index corresponding to the assigned number. A hash function converts an input from a typically large domain into an output in a typically smaller range (e.g., the hash value, often a subset of the integers). Requests to the hash table can be made using a key or other identifier for the information to be found. The key is transformed using a hash function into a "hash value" or a number describing the location of the information.

Overview

Embodiments of the present invention provide techniques for monitoring traffic on high speed Internet connections and determining if the traffic includes user identifiers of interest. These techniques can be used to efficiently identify user traffic associated with specific users by efficiently identifying user identifiers associated with specific users. These techniques can optimize string search techniques for user identification to significantly reduce the frequency of string comparisons made to a user ID directory. This greatly reduces the processing load on a collection monitor. These techniques can be universally applied to all computer traffic to find user identifiers regardless of the particular application protocol and do not require decoding each particular application protocol. As such, these techniques are independent of the application protocols being used, and performance does not decline as new application protocols are included in the traffic which is being searched. These techniques are practical for commercial use or for use in small, low-power applications. For example, these techniques can be used at broadband monitoring points such as data centers that provide access to the Internet.

FIG. 1 is a block diagram of a network monitor 100 according to one exemplary embodiment of the invention.

The network monitor 100 comprises a translator 120, a state machine 150, a shift register 160, a memory 170, and a comparator 180. The translator 120 is coupled to the state machine 150 and the shift register 160, the state machine 150 is also coupled to the shift register 160, the shift register 160 is coupled to the memory 170 and the comparator 180, and the memory 170 is also coupled to the comparator 180. The various illustrative logical blocks, modules, and circuits described in connection with the embodiments disclosed herein may be implemented or performed with a general purpose processor, a content addressable memory (CAM), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The input to the translator 120 comprises network traffic which comprises a data stream of information units 110. The information units typically comprise bytes of digitally transmitted data packets, where each data packet includes one or more bytes of data. In one implementation, the stream 110 of information units can comprise the payload portions of computer packets such as Internet Protocol IP packets.

The translator 120 classifies each information unit 110 as being one of a first information type, a second information type, or a marker. In one embodiment, the first information type comprises a valid character used to create the user identifier, each marker comprises a delimiter character used to mark the user identifier, and the second information type comprises an invalid character used for purposes other than to create and mark the user identifier. Based on the classification the translator 120 then generates an information stream 130 which includes classification information for each information unit. The translator 120 can also map a value of each first information type to a compressed data value corresponding to that first information type, and generate compressed data values 140. Each of the compressed data values 140 generated by the translator 120 correspond to one of a series of incoming first information types.

Although FIG. 1 shows an exemplary embodiment that processes one information unit at a time, it should be appreciated that processing speed increases when more information units 110 are processed in parallel. For example, it should be appreciated that in other implementations, that the translator 120 can process words comprising two or more information units and thereby operate on multiple information units at the same time. When two information units are processed in parallel the processing speed doubles, when three information units are processed in parallel the processing speed triples, and so on. Any number of information units 110 can be processed in parallel without deviating from the spirit of the invention.

The state machine 150 can be coupled to the translator 120 and the shift register 160. The state machine 150 receives the information stream of classification information 130 and detects markers in the information stream. The state machine 150 controls the shift register 160 and clears the contents of the shift register 160 when a first marker or a second information type is detected, and generates instructions 155 which instruct the shift register 160 to begin storing compressed data values corresponding to each first information type 140 until a second marker is detected.

The shift register 160 is coupled to the translator 120, and can receive compressed data values 140 corresponding to each first information type from the translator 120. The shift register 160 is also coupled to the state machine 150, and can store compressed data values corresponding to each first information type 140 responsive to instructions 155 from the state machine 150. The state machine 150 controls the shift register 160 such that it generates register contents 165.

The memory 170 is coupled to the shift register 160. The memory 170 comprises a user identifier list which includes user identifiers for users of interest. The memory 170 can receive the register contents 165 which can be used to address to the memory 170. The memory 170 generates memory contents 175 in response to the address.

The comparator 180 is coupled to the shift register 160 and the memory 170. The comparator 180 compares the memory contents 175 with the register contents 165 to determine if the register contents 165 match one of the user identifiers stored in the memory 170. If the comparator determines that the register contents 165 match one of the user identifiers stored in the memory 170, the comparator 180 generates an indication 185 that further inspection should be made.

Exemplary Implementation

Figure 2:
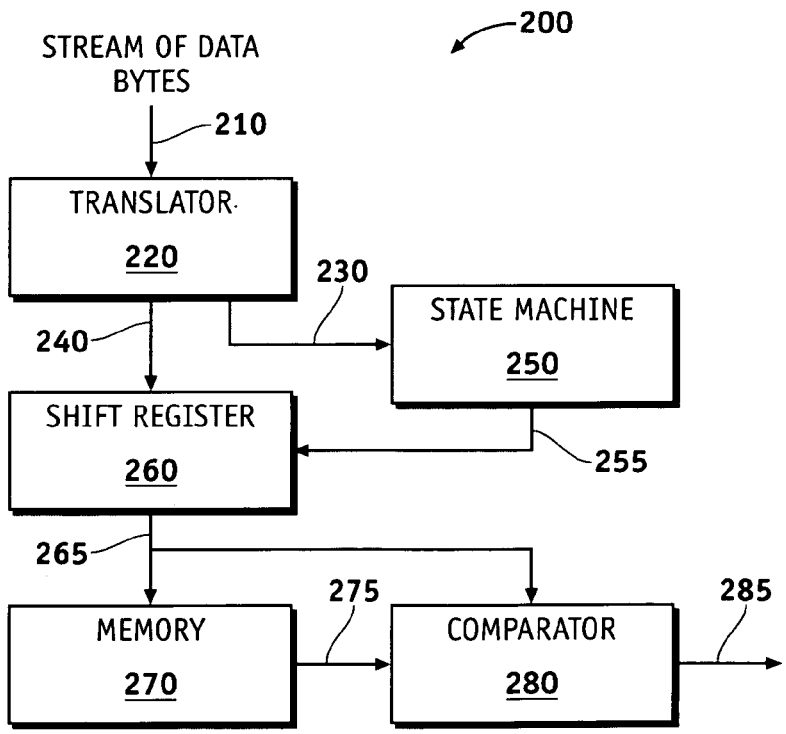
FIG. 2 is a block diagram of a network monitor according to one implementation of the network monitor of FIG. 1.

FIG. 2 is a block diagram of a network monitor according to one implementation of the network monitor of FIG. 1.

The network monitor 200 comprises a translator 220, a state machine 250, a shift register 260, a memory 270, and a comparator 280. The translator 220 is coupled to the state machine 250 and the shift register 260, the state machine 250 is also coupled to the shift register 260, the shift register 260 is coupled to the memory 270 and the comparator 280, and the memory 270 is also coupled to the comparator 280.

The translator 220 receives a byte stream or time series of data bytes 210. The translator 220 classifies each byte as a valid, invalid, or delimiter byte and passes this classification information 230 to the state machine 250. Further, the translator 220 maps a value of each valid byte to a compressed value 240 and loads the compressed values 240 into the shift register 260. In one embodiment, the translator 220 can be implemented as a lookup table with 8 address inputs and 9 data outputs. The look up table receives an input comprising an eight bit data value for each incoming byte which can be presented as the address to the look up table. The look up table outputs nine data outputs which correspond to a compressed data value 240 for each valid byte, and a classification 230 of the data value as one of a valid byte, an invalid byte, or a delimiter. In one implementation, each compressed data value 240 comprises a 6-bit compressed data value, and each classification 230 of the data value comprises a 3-bit tag which, at a minimum, classifies each byte as one of a valid byte, an invalid byte, or delimiter. Compressing the data values can improve efficiency. Any known compression techniques can be used, such as a simple arbitrary mapping (e.g. a=0, b=1, c=2, and so on). In one embodiment, only alphanumeric characters may be considered valid without regard to capitalization. The 36 valid characters, 10 numerals and 26 alpha characters, can be represented by a 6-bit value. The reduction from 8 bits to 6 bits can increase efficiency by 25%.

The state machine 250 instructs the shift register 260 to begin storing the compressed values 230 of valid characters when a first delimiter is received and continue storing the compressed values of valid characters 230 until it detects the next delimiter. At this point, the shift register 260 contains the compressed values between two delimiters which represent a possible user identifier. The state machine 250 initiates a memory table lookup whenever a sequence of consecutive or successive valid bytes is bounded by the first and second delimiters to determine if the sequence matches a user identifier of interest. In one implementation, before initiating the memory table lookup, the state machine 260 can verify that a length of the sequence of the consecutive or successive valid bytes is greater than or equal to a minimum value and less than or equal to a maximum value, where the minimum and maximum values are determined by the specific user identifiers of interest. This step improves efficiency by eliminating very long and very short strings from the memory table lookup process.

The shift register 260 is under the control of the state machine. The state machine 250 clears the contents of the shift register 260 whenever a delimiter or invalid character is received. The shift register 260 is coupled to the translator 220, and can receive compressed data values 240 corresponding to each valid byte from the translator 220. The shift register 260 is also coupled to the state machine 250, and can be instructed by the state machine 250 to begin or end storing of the compressed data values 240 corresponding to each valid byte from the translator 220. The shift register 260 generates register contents 265 which can be used to address the memory 270 which contains a list of user IDs.

Figure 3:
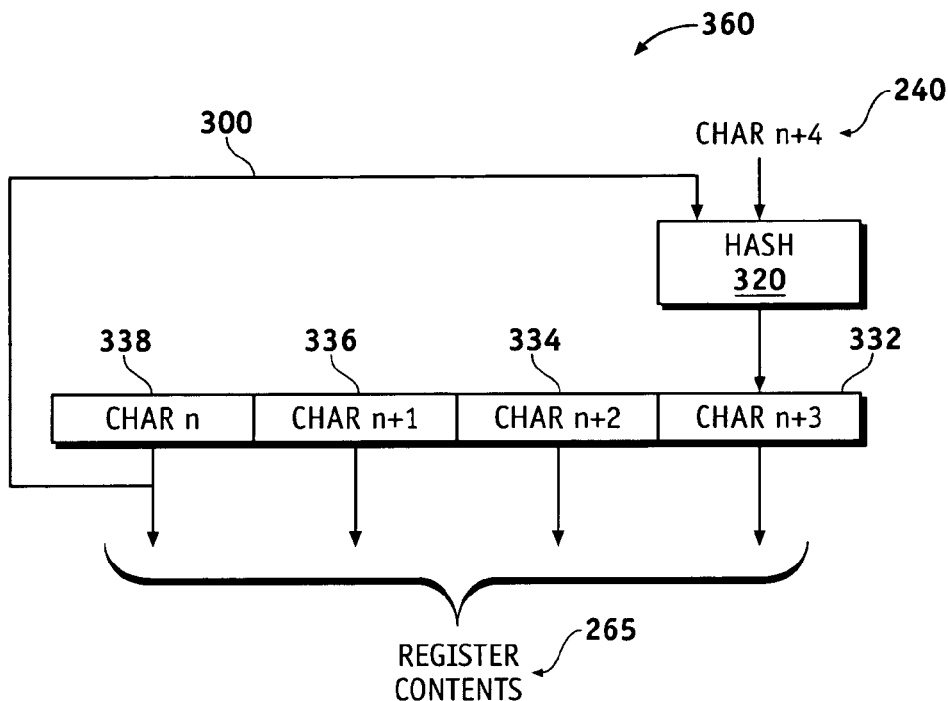
FIG. 3 is a block diagram of one possible implementation of the shift register shown in FIG. 2.

FIG. 3 is a block diagram which depicts one possible implementation of the shift register 360 shown in FIG. 2. In this implementation, the shift register 360 comprises a register and a hash function block 320 coupled to a register 330. The compressed values of valid data bytes are represented as a series of characters denoted as char n, char n+1, char n+2, and char n+3.

The register 330 comprises a plurality of register positions 332-338. Each of the register positions 332-338 holds one character of the register contents 265. For simplicity the shift register 330 is shown as being four positions in length, however, the shift register 330 can be of any length. For example, some implementations will have register lengths of ten or more positions. In this embodiment, the first register position 332 can initially hold an original first hash character (char n+3), a second register position 334 can initially hold an original second hash character (char n+2), a third register position 336 can initially hold an original third hash character (char n+1), and an end register position 338 can initially hold a fourth hash character (char n.) The register contents 265 shift by one register position each time a new incoming valid byte 240 is input to the hash function block 320. The register 330 then receives the new first hash character at the first register position 332 and outputs each of the current hash characters at each of the register positions 332-338 as the register contents 265.

The state machine 250 clears the contents of the register 330 whenever a delimiter or invalid character is received. The hash function block 320 receives each compressed value from the translator 220, represented as char n+4 in FIG. 3. The hash function block 320 combines each compressed value of each incoming valid byte 240 with contents of an end register position 338 of the register 330 (e.g., the fourth hash character (char n)) to generate a new first hash character (char n+3). To make room for each new character entry in the register 330, the contents of the register 330 are shifted by one character each time a new value is input from the hash function 320. The output of the hash function 320, new first hash character (char n+3), is then loaded into a first register position 332 of the register 330. Eventually the register 330 fills and the oldest data is hashed with the newest data. Although any hash code can be used, in one embodiment, the hash function 320 uses an exclusive-or (XOR) process to hash the compressed value of each incoming valid byte (e.g., the incoming value char n+4) with the fourth hash character (e.g., the content at char n at the end register position 338 of the register 330) to generate the new first hash character (char n+3). As such, in the initialized state, when the value of char n is zero, the value of char n+4 will be entered into the register 330 without being altered.

Referring again to FIG. 2, in one implementation, the memory 270 comprises a hash lookup table containing a hash key. The entire contents 265 of the shift register 260 are hashed to generate an address to the hash lookup table. This results in an address having a fixed length value that is passed to a memory table in the memory 270. The memory 270 uses the address to generate memory contents 275.

The comparator 280 is used to compare the memory contents 275 with the register contents 265 to determine if there is a match to a user ID of interest stored in the memory 270. In one implementation, the comparator 280 compares the hash key with the register contents 265, and if the hash key matches the register contents 265, then the comparator generates an indication 285 that the register contents 265 contain a user ID of interest and should be further inspected. Further inspection could include, for example, determining if the traffic is truly email, or if the email is being sent to the user of interest or from the user of interest. This could also include checking for mail from one user of interest to another user of interest.

Although FIG. 2 shows the translator 220 as receiving a stream or time series of data bytes 210, it should be appreciated that the translator 220 can also receive words comprising two or more bytes. Inputting words to the translator 220 increases processing speed by operating on multiple bytes at the same time. Although this exemplary embodiment processes one byte of data a single character at a time, it should be appreciated that processing speed increases when the width of the incoming data 110 is increased so that more characters can be processed in parallel. For example, the processing speed doubles when two bytes are processed in parallel, triples when three are processed in parallel, and so on. Any number of characters can be processed in parallel without deviating from the spirit of the invention.

Figure 4:
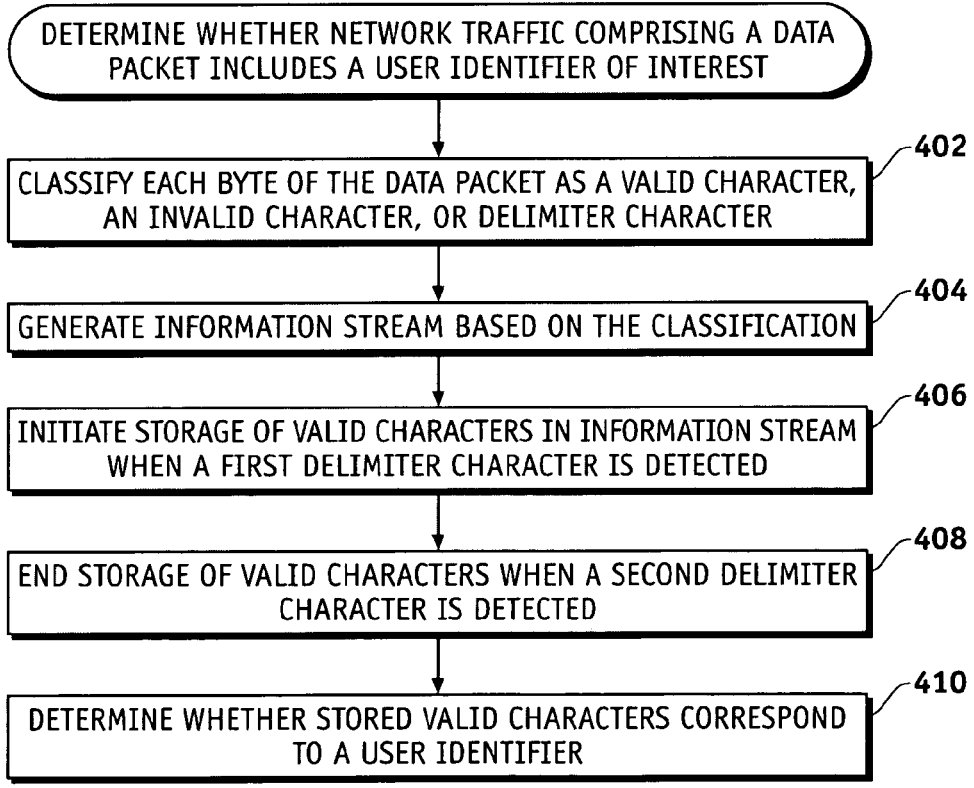
FIG. 4 is a flow chart showing an exemplary method for determining whether network traffic includes a user identifier of interest.

FIG. 4 is a flow chart showing an exemplary method for determining whether network traffic includes a user identifier of interest. At step 402, each byte of network traffic is classified as being either a valid character, an invalid character, or a delimiter character. At step 404, an information stream can be generated based on the classification. At step 406, storage of valid characters in the information stream can be initiated when a first delimiter character is detected. At step 408, storage of valid characters in the information stream can be stopped when a second delimiter character is detected. At step 410, the stored valid characters between the first delimiter character and the second delimiter character can be examined to determine whether the stored valid characters correspond to a user identifier.

EXAMPLE

Each byte of an incoming byte stream that is input to the translator 210 can be classified, based on its binary value, into one of three groups: valid data values (v), delimiter values (d), and invalid data values (i). Valid data values (v) are byte values used in the construction of user identifiers such as alpha-numeric characters (e.g. a-z, A-Z, and 0-9) and special characters (e.g. underscore, period, @). Delimiter values (d) are byte values that bracket user IDs such as spaces, <, >, etc. Invalid data values (i) comprises all values that don't fall into either of the other two groups such as non-printable characters (e.g. NUL, BEL, CR, LF: etc.) and non-ASCII values. The translator 240 can use three groups to represent the incoming byte streams received by the translator 240.

In the following example (1), the first byte string of the incoming byte stream which is bracketed by two delimiter values (d) consists of 22 valid data values (v).

byte stream=iviivdvvvvvvvvvvvvvvvvvvvvvdvdvvivvvdv     (1)

The byte values of the 22 valid data values (v) have the ASCII equivalence of bobby.smith@boeing.com. In this example, the 22 valid data values (v) can be compared with a directory of user IDs to determine if the e-mail address bobby.smith@boeing.com is "of interest." If it is determined that byte values of the 22 valid data values (v) correspond to a user identifier of interest, then the 22 valid data values (v) will pass a directory comparison. By contrast, if the byte values of the 22 valid data values (v) does not contain a user identifier of interest, then it will fail the directory comparison and is simply a valid ID with no matching directory entries. The second byte string bracketed by two delimiter values (d) is only one valid byte (v) in length. As such, the second byte string can be discarded as too short by applying a minimum ID length rule. The third byte string bracketed by delimiter values (d) contains an invalid data value (i) and can also be discarded. As such, this 39-byte example requires only one comparison with the user directory (i.e., the 22 valid data values). By contrast, a conventional string search approach would require 39 comparisons since one comparison is needed on each one of the 39 byte positions.

Figure 5:
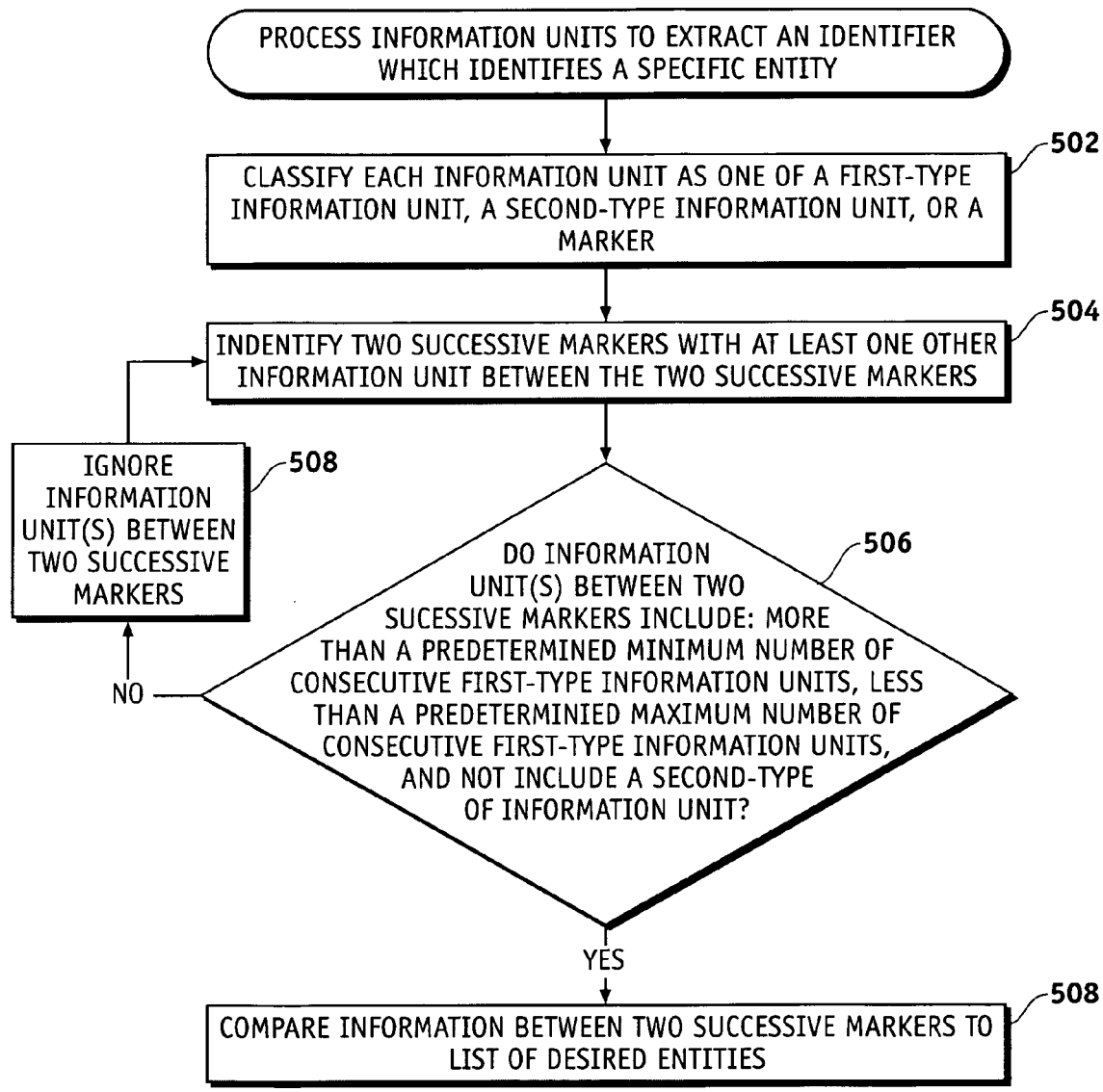
FIG. 5 is a flow chart showing an exemplary method for processing information units to extract a user identifier of interest from network traffic.

FIG. 5 is a flow chart showing an exemplary method for processing information units to extract a user identifier of interest from network traffic. This method can be used to process the information units to extract a user identifier which identifies a specific entity of interest.

At step 502, each information unit can be classified as one of a first-type information unit, a second-type information unit, or a marker. The first-type information unit may comprise information unit values used to create the identifier, such as valid characters, the marker may comprise information unit values used to mark the identifier, such as a delimiter, and the second-type information unit may comprise other information unit values used for purposes other than to create and mark the identifier, such as invalid characters.

At step 504, two successive markers within the network traffic are identified, and a portion of the network traffic, comprising at least one other information unit, between the two successive markers can be stored. In one embodiment, the information units between the two successive markers can be compressed as compressed values, and storage of the compressed values begins when a first marker or delimiter is detected, and ends when a second marker or delimiter is detected.

At step 506, it is determined whether the portion of the information between the two successive markers includes the same or more than a predetermined minimum number of consecutive first-type information units, includes the same or less than a predetermined maximum number of consecutive first-type information units, and does not include a second-type of information unit. If the portion of the information between the two successive markers does not include the same or more than a predetermined minimum number of consecutive first-type information units, includes more than the predetermined maximum number of consecutive first-type information units, or does include a second-type of information unit, then the process ends and the portion of the information between the two successive markers is discarded or ignored, and at step 504, another portion of the information between the next two successive markers is identified.

If the portion of the information between the two successive markers does include the same or more than a predetermined minimum number of consecutive first-type information units, includes the same or less than the predetermined maximum number of consecutive first-type information units, and optionally if the portion of the information between the two successive markers is free of the second-type of information units, then at step 508, then the portion of the information between the two successive markers can be compared to a list of desired entities or "user's of interest."

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For example, the flow charts of FIG. 4 or 5 can be implemented in a processor.

Figure 6:
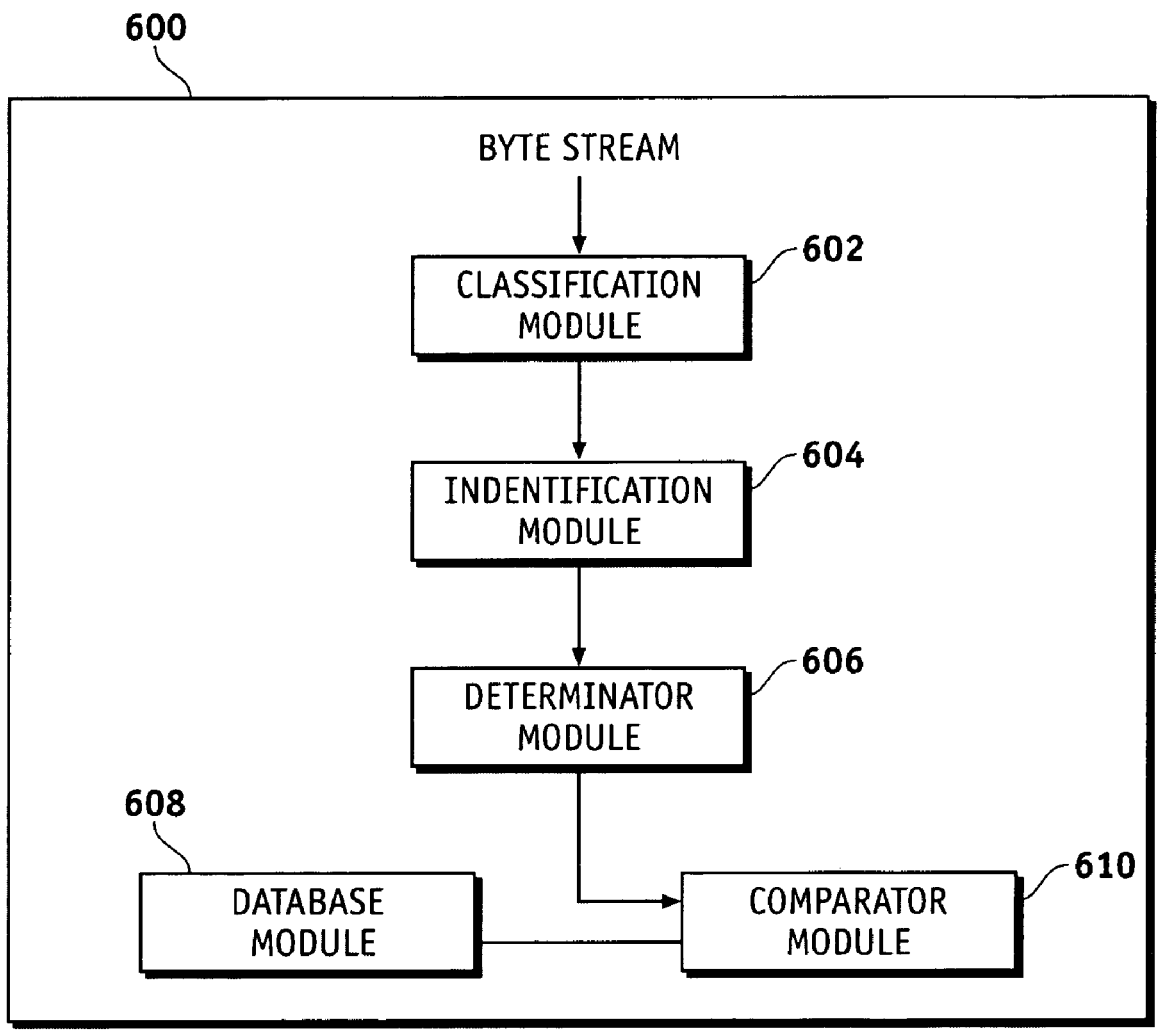
FIG. 6 is a block diagram of a processor configured to extract user identifiers which from an Internet byte stream of user traffic.

FIG. 6 is a block diagram of a processor configured to extract user identifiers from an Internet byte stream of user traffic. This processor 600 can include a number of modules such as, a classification module 602, an identification module 604, a determinator module 606, a database module 608 comprising a user directory of desired users or "users of interest," and a comparator module 610.

The classification module 602 can classify each byte of the byte stream as one of a valid data byte, a delimiter byte or an invalid data byte based on a binary value of the byte.

The identification module 604 can identify two successive delimiter bytes within the byte stream, wherein a portion of the byte stream comprising at least one other byte is included between the two successive delimiter bytes.

The determinator module 606 can determine whether the portion of the byte stream between the two successive delimiter bytes includes the same or more than a predetermined minimum number of consecutive valid data bytes and can discard the portion of the byte stream between the two successive delimiter bytes if it does not include the same or more than a predetermined minimum number of consecutive valid data bytes. The determinator module 606 can also determine whether the portion of the byte stream between the two successive delimiter bytes includes the same or less than a predetermined maximum number of consecutive valid data bytes, and can discard the portion of the byte stream between the two successive delimiter bytes if it includes the more than the predetermined maximum number of consecutive valid data bytes. The determinator module 606 can also determine whether the portion of the byte stream between the two successive delimiter bytes includes an invalid byte, and discard it if it includes an invalid byte.

The comparator module 610 can compare the portion of the byte stream between the two successive delimiter bytes to the user directory if the portion of the byte stream between the two successive delimiter bytes includes the same or more than a predetermined minimum number of consecutive valid data bytes and includes the same or less than a predetermined maximum number of consecutive valid data bytes. If the portion of the byte stream between the two successive delimiter bytes includes the same or more than a predetermined minimum number of consecutive valid data bytes and includes the same or less than a predetermined maximum number of consecutive valid data bytes, then the comparator module 610 can compare the portion of the byte stream between the two successive delimiter bytes to the user directory of desired users to determine if the portion of the byte stream between the two successive delimiter bytes matches the entry in the user directory of desired users. Even if each specific user identifier uses a different application protocol which requires unique processing to extract the specific user identifier, this processor 600 can efficiently extract the specific user identifier without decoding the application protocol and without checking every byte position in the user traffic for the specific user identifier.

Thus, numerous embodiments have been disclosed above which can provide techniques and computer data processing architectures for implementing string search techniques to look for user IDs on high-speed networks. The embodiments of this invention can be implemented in either software or hardware. Parallel hardware implementations, in which the grouping of many bytes can be done at the same time (e.g., in parallel), are particularly effective since processing speed increases. These techniques can be realized with a simple state machine that can be optimized in an FPGA or ASIC to run at very high speeds. These techniques can reduce the frequency of directory lookups when searching for user IDs by at least 10 times. Theses techniques can achieve an estimated 80% power savings over existing methods and its simple design is suitable for implementation on commercial off-the-shelf (COTS) processing platforms, eliminating the need for costly development of specialized platforms. Consequently, a low cost, low power commercial network monitor can be provided.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments.

It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A method for identifying data associated with a desired entity, wherein the data is contained in a plurality of information exchanged over a network, and wherein the method operates irrespective of a protocol, the method comprising:

receiving, at a translator, a byte of information from the plurality of information;

classifying, by the translator, the byte of information as being one of a valid character, an invalid character, and a delimiter;

concatenating, at a register, an information unit to a string of characters in response to classifying the byte of information as the valid character, wherein the string is in the register;

clearing the register in response to classifying the byte of information as one of the invalid character and the delimiter;

responsive to classifying the byte of information as the delimiter, determining, by a determinator module, whether the string contains a number of characters that is greater than a predetermined minimum value and less than a predetermined maximum value, unless the register was last cleared in response to classifying the byte of information as the invalid character;

comparing, by a comparator module, the string to a set of desired entities in response to determining that the number of characters is greater than a predetermined minimum value and less than a predetermined maximum value; and responsive to identifying the desired entity in the string, storing data associated with the string.

2. The method of claim 1 wherein decoding of a plurality of different protocols is avoided.

3. The method of claim 1 wherein the desired entity comprises a user identifier.

4. The method of claim 3 wherein the data associated with the string comprises an email.

5. The method of claim 4 wherein decoding of an email protocol associated with the email is avoided.

6. The method of claim 4 further comprising:
checking for a second email from the desired entity to another desired entity.

7. The method of claim 4 further comprising:
determining if the email is being sent to the desired entity or from the desired entity.

8. The method of claim 1 wherein the set of desired entities comprises a hash table and wherein the method further comprises:
hashing the string, wherein a hashed string is generated, and wherein comparing comprises comparing the hashed string to a hash key.

9. A computer-readable storage medium storing a software module that, when executed on a computer, performs a method for identifying data associated with a desired entity, wherein the data is contained in a plurality of information exchanged over a network, and wherein the method operates irrespective of a protocol the method comprising:

receiving, at a translator, a byte of information from the plurality of information;

classifying, by the translator, the byte of information as being one of a valid character, an invalid character, and a delimiter;

concatenating, at a register, an information unit to a string of characters in response to classifying the byte of information as the valid character, wherein the string is in the register;

clearing the register in response to classifying the byte of information as one of the invalid character and the delimiter;

responsive to classifying the byte of information as the delimiter, determining, by a determinator module, whether the string contains a number of characters that is greater than a predetermined minimum value and less than a predetermined maximum value, unless the register was last cleared in response to classifying the byte of information as the invalid character;

comparing, by a comparator module, the string to a set of desired entities in response to determining that the number of characters is greater than a predetermined minimum value and less than a predetermined maximum value; and responsive to identifying the desired entity in the string, storing data associated with the string.

10. The computer-readable storage medium of claim 9 wherein decoding of a plurality of different protocols is avoided.

11. The computer-readable storage medium of claim 9 wherein the desired entity comprises a user identifier.

12. The computer-readable storage medium of claim 11 wherein the data associated with the string comprises an email.

13. The computer-readable storage medium of claim 12 wherein decoding of an email protocol associated with the email is avoided.

14. The computer-readable storage medium of claim 12 wherein the method further comprises:
checking for a second email from the desired entity to another desired entity.

15. The computer-readable storage medium of claim 12 wherein the method further comprises:
determining if the email is being sent to the desired entity or from the desired entity.

16. The computer-readable storage medium of claim 9 wherein the set of desired entities comprises a hash table and wherein the method further comprises:
hashing the string, wherein a hashed string is generated, and wherein comparing comprises comparing the hashed string to a hash key.

17. A data processing system comprising:
a processor;
a bus connected to the processor; and
a first memory connected to the bus, wherein the memory stores a software module that, when executed by the processor, performs a method for identifying data associated with a desired entity, wherein the data is contained in a plurality of information exchanged over a network, and wherein the method operates irrespective of a protocol a translator for receiving a byte of information from the plurality of information, wherein the translator classifies the byte of information as being one of a valid character, an invalid character, and a delimiter;

a register for concatenating an information unit to a string of characters in response to classifying the byte of information as the valid character, wherein the string is in the register;

a state machine for clearing the register in response to classifying the byte of information as one of the invalid character and the delimiter;

a determinator module for determining, in response to classifying the byte of information as the delimiter, whether the string contains a number of characters that is greater than a predetermined minimum value and less than a predetermined maximum value, unless the register was last cleared in response to classifying the byte of information as the invalid character;

a comparator module for comparing the string to a set of desired entities in response to determining that the number of characters is greater than a predetermined minimum value and less than a predetermined maximum value; and a second memory for storing data associated with the string in response to identifying the desired entity in the string.

18. The data processing system of claim 17 wherein decoding of a plurality of different protocols is avoided.

19. The data processing system of claim 17 wherein the desired entity comprises a user identifier.

20. The data processing system of claim 19 wherein the data associated with the string comprises an email.

21. The data processing system of claim 20 wherein decoding of an email protocol associated with the email is avoided.

22. The data processing system of claim 20 wherein the method further comprises:

checking for a second email from the desired entity to another desired entity.

23. The data processing system of claim 20 wherein the method further comprises:

determining if the email is being sent to the desired entity or from the desired entity.

24. The data processing system of claim 17 wherein the set of desired entities comprises a hash table and wherein the method further comprises:

hashing the string, wherein a hashed string is generated, and wherein comparing comprises comparing the hashed string to a hash key.

\* \* \* \* \*